United States Patent Office 3,708,535
Patented Jan. 2, 1973

3,708,535
[2-(DIHALOPHOSPHINYL)-1-METHYLVINYL]
ONIUM HALIDES
Raymond A. Firestone, Fanwood, N.J., assignor to Merck
& Co., Inc., Rahway, N.J.
No Drawing. Filed Feb. 3, 1969, Ser. No. 796,173
Int. Cl. C07f 9/42, 9/54
U.S. Cl. 260—543 P                           4 Claims

ABSTRACT OF THE DISCLOSURE

A method for the preparation of (cis-1,2-epoxypropyl)phosphonic acid and its ester, amide and salt derivatives via the reaction of a {2-[disubstituted oxy (or tetrasubstituted amino or dihalo)phosphinyl]-1-methylvinyl} onium halide with a base. The term "onium" includes radicals selected from sulfonium, sulfoxonium, ammonium, phsphonic acid and its salts are useful as antimicrobial phosphonium and the like. The (cis-1,2-epoxypropyl) phosphoric acid and its salts are useful as antimicrobial agents and inhibit the growth of gram-negative and gram-positive pathogenic bacteria.

---

This invention relates to a novel method for the preparation of (cis-1,2-epoxypropyl)phosphonic acid and its ester, amide and salt derivatives (I) by treating a {2-[disubstituted oxy (or tetra-substituted amino or dihalo) phosphinyl]-1-methylvinyl}onium halide (II) with a base. The term "onium" includes radicals such as sulfonium, sulfoxonium, ammonium, phosphonium and the like. The (cis-1,2-epoxypropyl)phosphonic acids and its salts, such as the sodium and calcium salts, are antimicrobial agents which have utility inhibiting the growth of gram-positive and gram-negative pathogenic bacteria and are active against Bacillus, Escherichia, Staphylococci, Salmonella and Proteus pathogens, and antiobiotic-resistant strains thereof. Thus, (cis-1,2-epoxypropyl)phosphonic acid and the salts thereof can be used as antiseptic agents to remove susceptible organisms from pharmaceutical, dental and medical equipment and can also be used in other areas subject to infection by such organisms.

The novel process of this invention comprises treating a {2-[disubstituted oxy (or tetra-substituted amino or dihalophosphinyl] - 1 - methylvinyl}onium halide with a base, for example, an alkali metal base such as sodium hydroxide, potassium hydroxide and the like to afford a (cis-1,2-epoxypropyl)phosphonate product which, if desired, may be converted to (cis-1,2-epoxypropyl)phosphonic acid via the several methods discussed below. The temperature at which the reaction is conducted is not a critical aspect of this invention and, in general, the reaction may be conducted in the range of from about —10° C. up to boiling point of the particular solvent being used. The choice of a suitable solvent depends to a large extent upon the nature of the starting material. For example, water is the preferred solvent when the starting material is a [2-dihalophosphinyl - 1 - methylvinyl]onium halide, whereas, ether solvents such as tetrahydrofuran, 1,2-dimethoxyethane, bis-(2-methoxyethyl)ether, diethyl ether and the like are the solvents of choice when the starting material is a {2-[disubstituted oxy (or tetra-substituted amino)phosphinyl]-1-methylvinyl}onium halide. The following equation illustrates the process of this invention:

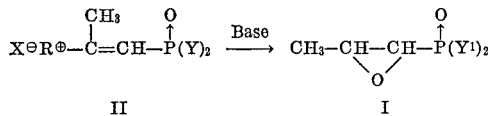

II           I wherein R⊕ is an "onium" cation selected from di-lower alkylsulfoxonium such as dimethylsulfoxonium and the like, tri-lower alkylammonium such as trimethylammonium and the like, triarylphosphonium as, for example, a mononuclear triarylphosphonium cation such as triphenylphosphonium and the like or di-lower alkylsulfonium such as dimethylsulfonium and the like; Y is halo such as bromo, chloro and the like, di-substituted amino as, for example, a di-lower alkylamino moiety such as, dimethylamino, diethylamino and the like or a radical of the formula: OR wherein R is alkyl, for example, lower alkyl such as methyl, ethyl, n-propyl, isopropyl, n-butyl, pentyl and the like, lower alkenyl such as allyl and the like, lower alkynyl such as propynyl and the like, aralkyl, for example, mononuclear aralkyl such as benzyl and the like, aryl, for example, mononuclear aryl, such as phenyl and the like; $Y^1$ is a disubstituted amino moiety as, for example, di-lower alkylamino, such as dimethylamino, diethylamino and the like, a radical of the formula: OR wherein R is as defined above or, when Y is halo, the moiety

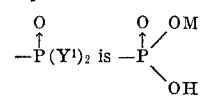

wherein M is the cation derived from an alkali metal such as sodium cation, a potassium cation and the like, and X⊖ is an anion such as chloride, bromide and the like.

When the reaction of a {2-[disubstituted oxy (or tetra substituted amino or dihalo)phosphinyl]-1-methylvinyl} onium halide (II) with a base results in a isomeric mixture of the desired product, the isomers may be separated by various methods, as for example, by gas or adsorption chromatography.

The ester derivatives of (cis-1,2-epoxypropyl)phosphonic acid may be converted to (cis-1,2-epoxypropyl) phosphonic acid or its salts by various methods including treatment with an aqueous solution of mineral acid such as hydrochloric acid or sulfuric acid under carefully buffered conditions, by hydrogenolysis, by treatment with an aqueous solution of an alkali metal or alkaline earth metal hydroxide, by treatment with trimethylchlorosilane followed by aqueous hydrolysis, by exposure to ultraviolet light or enzymatically.

The choice of a suitable method for the conversion the esters to (cis-1,2-epoxypropyl)phosphonic acid or its salts depends to a large extent upon the character of the ester moiety. For example, when the ester is a methyl ester, the conversion to (cis-1,2-epoxypropyl)phosphonic acid is advantageously conducted by treating the ester with trimethylchlorosilane followed by the aqueous hydrolysis of the silane ester intermediate thus obtained to the free acid. In addition to the foregoing, the alkyl esters of (cis-1,2-epoxypropyl)phosphonic acid and the aryl analogs thereof may be converted to the free acid by alkaline hydrolysis. Hydrogenolysis is particularly effective in converting alkenyl esters of (cis-1,2-epoxypropyl) phosphonic acid to the corresponding acid.

Amides of (cis-1,2-epoxypropyl)phosphonic acid may be converted to (cis-1,2-epoxypropyl)phosphonic acid via the use of acidic hydrolyzing agents such as aqueous hydrochloric acid, hydrobromic acid, sulfuric acid and the like.

The designation cis used in describing the (1,2-epoxypropyl)phosphonic acid compounds means that each of the hydrogen atoms attached to carbon atoms 1 and 2 of the propyl phosphonic acid are on the same side of the oxide ring.

The {2-[disubstituted oxy (or tetra-substituted amino or dihalo)phosphinyl]-1-methylvinyl}onium halide (II, infra) which is employed as an intermediate in the preparation of the (cis -1,2 - epoxypropyl)phosphonic acid, esters, amides and salt derivatives (I, supra) is conveniently obtained by treating a (2-halo-1-methylvinyl) onium halide (III, infra) with a tri-substituted phosphite (Y=OR), with a dihalo alkoxy phosphine (Y=halo) or with a lower alkoxy phosphonic acid tetra-lower alkyl amide. This reaction is conveniently conducted by mixing the reagents in the temperature range of from about −10° C. to 25° C. and then slowly warming the reaction up to a temperature of about 100° C. for a period of from one to two hours, depending on the reactivity of the particular reagents involved. The following equation illustrates this method of preparation:

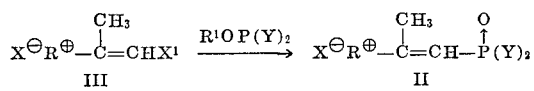

wherein $R^\oplus$, $X^\ominus$ and Y are as defined above; $X^1$ is halo such as bromo, chloro and the like and $R^1$ is the cation derived from an alkali metal such as sodium, potassium and the like or the radical R wherein R is as defined above.

The (2-halo-1-methylvinyl)onium halide (III, infra) which are useful as intermediates in the preparation of the {2-[disubstituted oxy (or tetra-substituted amino or dihalo)phosphinyl] - 1 - methylvinyl}onium halide (II, supra) are prepared by reacting a (2-dihalo-1-methylethyl)onium halide (IV, infra) with a strong base, for example, an alkali metal alkoxide such as potassium tertiary butoxide, sodium methoxide and the like, or an organo metallic compound, for example, an organo lithium compound such as phenyllithium and the like. While the temperature at which the reaction is conducted is not a critical aspect of this invention, the reaction is conveniently conducted at ambient temperature or slightly above ambient temperature. Any solvent which is inert to the particular reagents being used and in which the reagents are soluble may be employed in this reaction, suitable solvents include, for example, dimethylsulfoxide, dimethylformamide, diethyl ether and the like. The following equation illustrates this method of preparation:

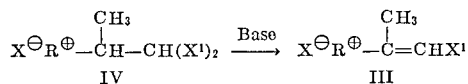

wherein $R^\oplus$, $X^\ominus$ and $X^1$ are as defined above.

The (2-dihalo-1-methylethyl)onium halide (IV, infra) intermediates used in the preparation of the (2-halo-1-methylvinyl)onium halides (III, supra) are prepared by reacting 1,1-chloro-2-bromopropane (V, infra) with a nucleophilic agent. The following equation illustrates this method of preparation:

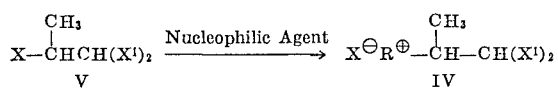

wherein $R^\oplus$, $X^\ominus$ and $X^1$ are as defined above, and the nucleophilic agent, includes dialkyl sulfide, for example, di-lower alkyl sulfide such as dimethylsulfide and the like; trialkylamine, for example, a tri-lower alkylamine such as trimethylamine, triethylamine and the like; di-lower alkylsulfoxide such as dimethylsulfoxide and the like, triphenylphosphine and the like and X is halo such as bromo and the like. The temperature at which the reaction is conducted depends on the reactivity of the particular nucleophilic reagent employed and has been found to vary from 80° C. for the more volatile reagents, that is, the di-lower alkylsulfides and tri-lower alkylamines and, also, for triphenylphosphine up to the boiling point of the lesser reactive di-lower alkylsulfoxides. When the particular reagent being employed is a di-lower alkylsulfide or tri-lower alkylamine, the reaction is conveniently conducted in the absence of a solvent in a sealed container. When the reagent is triphenylphosphine, any solvent which is inert to the reactants may be employed such as benzene and the like. When a di-lower alkylsulfoxide is the reagent of choice, an excess of the di-lower alkylsulfoxide is used as the solvent.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method for preparing (cis-1,2-epoxypropyl)phosphonic acid and its ester and salt derivatives of this invention. However, the examples are illustrative only and it will be apparent to those having ordinary skill in the art that all of the instant products may be prepared in an analogous manner by substituting the appropriate starting materials for those set forth in the examples.

EXAMPLE 1

(Cis-1,2-epoxypropyl)phosphonic acid and disodium salt

Step A: (2,2 - dichloro - 1 - methylethyl)dimethylsulfonium bromide.—1,1-dichloro-2-bromopropane (10 g., 0.0524 mole) and dimethylsulfide (25 g., 0.42 mole) are mixed and heated overnight at 80° C. at autogenic pressure in a sealed bomb. The bomb is cooled and opened and the excess dimethylsulfide evaporated to yield a thick mass which becomes crystalline upon trituration with ether. The crude product which separates is collected by filtration, washed with ether and recrystallized from a mixture of methanol and water to yield (2,2-dichloro-1-methylethyl)dimethyl sulfonium bromide.

Step B: (2 - chloro - 1-methylvinyl)dimethylsulfonium bromide.—(2,2 - dichloro - 1 - methylethyl)dimethylsulfonium bromide (10.0 g., 0.0394 mole) in dimethylsulfoxide (25 ml.) is added to a suspension of potassium tertiary butoxide (4.16 g., 0.037 mole) in dimethylsulfoxide (25 ml.). The reaction mixture is stirred for one hour at room temperature. The solvent is removed under vacuum and the crude (2-chloro-1-methylvinyl)dimethylsulfonium bromide is extracted with ethanol. The ethanol is removed under vacuum and the crude product which remains is recrystallized from a mixture of ethanol and ether to yield (2-chloro-1-methylvinyl)dimethyl sulfonium bromide.

Step C: [2 - (dimethoxyphosphinyl)-1-methylvinyl]dimethylsulfonium bromide.—(2 - chloro-1-methylvinyl)dimethylsulfonium bromide (7.85 g., 0.036 mole) is treated with trimethylphosphite (4.46 g., 0.036 mole) at −10° C. The reaction mixture is heated slowly to 50° C. over a two-hour period to yield [2-(dimethoxyphosphinyl)-1-methylvinyl]dimethylsulfonium bromide.

Step D: Dimethyl (cis-1,2-epoxypropyl)phosphonate.—To a solution of [2-dimethoxyphosphinyl)-1-methylvinyl]dimethylsulfonium bromide (10.0 g., 0.0344 mole) in tetrahydrofuran (100 ml.) is added powdered anhydrous potassium hydroxide (1.96 g., 0.035 mole). The reaction mixture is stirred for several hours at ambient temperature. The potassium chloride and unreacted hydroxide is removed by filtration and the filtrate is evaporated under vacuum to yield dimethyl (cis-1,2-epoxypropyl)phosphonate which is purified by vacuum distillation, B.P. 70–71° C./0.5 mm.

Step E: (Cis - 1,2 - epoxypropyl)phosphonic acid and disodium salt.—Dimethyl (cis - 1,2 - epoxypropyl)phosphonate (1 mm.) in trimethylchlorosilane (10 ml.) is refluxed for eight hours and the reaction mixture is then extracted with water to yield an aqueous solution of (cis - 1,2 - epoxypropyl)phosphonic acid. The product thus obtained is then treated with two equivalents of sodium hydroxide and the solution evaporated to yield disodium (cis-1,2-epoxypropyl)phosphonate.

EXAMPLE 2

(Cis-1,2-epoxypropyl)phosphonic acid monosodium salt

Step A: [2 - (dichlorophosphinyl) - 1 - methylvinyl] dimethylsulfonium bromide.—(2 - chloro - 1 - methylvinyl)dimethylsulfonium bromide (10 g., 0.046 mole), prepared as above in Example 1, Step B, is treated with dichloromethoxyphosphine (6.8 g., 0.046 mole) at ambient temperature. The reaction mixture is slowly heated to 100° C. and maintained there for one hour. The reaction mixture is then cooled and the unreacted dichloromethoxy phosphine formed during the course of the reaction is removed under vacuum to yield [2-dichlorophosphinyl)-1-methylvinyl]dimethylsulfonium bromide.

Step B: (Cis - 1,2 - epoxypropyl)phosphonic acid monosodium salt.—To an aqueous solution of sodium hydroxide (0.195 mole; 78 ml. of 2.5 N) at 0° C. is added [2 - (dichlorophosphinyl) - 1 - methylvinyl]dimethylsulfonium bromide (0.0394 mole). After stirring at 0° C. for 30 minutes, the reaction mixture is brought to a pH of 6. Removal of the solvent under vacuum yields (cis-1,2-epoxypropyl)phosphonic acid monosodium salt.

By substituting for the (2-chloro - 1 - methylvinyl)dimethylsulfonium bromide of Step A, Example 2, an equimolar quantity of (2-chloro-1-methylvinyl)dimethylsulfoxonium bromide, (2 - chloro - 1 - methylvinyl)trimethylammonium bromide or (2 - chloro - 1 - methylvinyl)triphenylphosphonium bromide and by following substantially the procedure described therein, there is obtained respectively [2-(dichlorophosphinyl) - 1 - methylvinyl]dimethylsulfoxonium chloride, [2 - (dichlorophosphinyl) - 1 - methylvinyl]trimethylammonium chloride, and [2 - (dichlorophosphinyl) - 1 - methylvinyl]triphenylphosphonium chloride which when substituted for the [2 - (dichlorophosphinyl) - 1 - methylvinyl]dimethylsulfonium bromide of Step B, Example 2, is converted to (cis - 1,2 - epoxypropyl)phosphonic acid monosodium salt by following substantially the procedure described therein.

EXAMPLE 3

(Cis-1,2-epoxypropyl)phosphonic Acid

Step A: (2,2-dichloro - 1 - methylethyl)triphenylphosphonium bromide.—To a solution of triphenylphosphine (26.2 g., 0.10 mole) in benzene (25 ml.) is added 1,1-dichloro-2-bromopropane (21.1 g., 0.11 mole). The reaction mixture is refluxed under nitrogen atmosphere overnight. The reaction mixture is cooled to room temperature whereupon (2,2 - dichloro - 1 - methylethyl)triphenylphosphonium bromide precipitates and is collected by filtration.

Step 5: (2 - chloro - 1 - methylvinyl)triphenylphosphonium bromide.—To a solution of phenyl lithium (8.4 g., 0.1 mole) in ether (100 ml.) is added, slowly, (2,2-dichloro - 1 - methylethyl)triphenylphosphonium bromide (45.4 g., 0.1 mole) under a nitrogen atmosphere with stirring. The reaction mixture is refluxed for 30 minutes and then cooled and the crude product collected by filtration. The crude product, which is contaminated with lithium chloride, is washed with ether and taken up in a small volume of ethanol. The insoluble lithium chloride is filtered off and the filtrate is diluted with ether to precipitate (2-chloro - 1 - methylvinyl)triphenylphosphonium bromide.

Step C: [2 - (dibenzyloxyphosphinyl) - 1 - methylvinyl]triphenylphosphonium bromide.—(2 - chloro - 1-methylvinyl)triphenylphosphonium bromide (33.4 g., 0.08 mole) is treated with tribenzyl phosphite (28.2 g., 0.08 mole) at −10° C. The reaction mixture is brought slowly to 50° C. over a two-hour period. The benzyl bromide formed during the course of the reaction is removed under vacuum to yield [2 - dibenzyloxyphosphinyl) - 1-methylvinyl]triphenylphosphonium bromide.

Step D: Dibenzyl (cis - 1, 2 - epoxypropyl)phosphonate.—To a solution of [2 - (dibenzyloxyphosphinyl)-1-methylvinyl]triphenylphosphonium bromide (45.0 g., 0.07 mole) in tetrahydrofuran (100 ml.) is added powdered anhydrous potassium hydroxide (3.93 g., 0.07 mole). The reaction mixture is stirred for several hours at ambient temperature and then filtered to remove the potassium chloride and unreacted potassium hydroxide. Evaporation of the filtrate, under vacuum, yields the crude product which is vacuum distilled to yield dibenzyl (cis - 1,2-epoxypropyl)phosphonate.

Step E: (cis - 1,2 - epoxypropyl)phosphonic acid.—A solution of dibenzyl (cis - 1,2 - epoxypropyl)phosphonate (0.1 mole) in ethanol (100 ml.) is hydrogenated over a 5% palladium on charcoal catalyst (1.0 g.) at atmospheric pressure at 25° C. When the mixture has taken up 0.2 mole of hydrogen, the mixture is filtered and the filtrate concentrated to dryness under vacuum to yield (cis-1,2-epoxypropyl)phosphonic acid.

EXAMPLE 4

(Cis-1,2-epoxypropyl)phosphonic acid

Step A: (2,2 - dichloro - 1 - methylethyl)dimethylsulfoxonium bromide.—1,1 - dichloro - 2 - bromopropane (19.2 g., 0.1 mole) and dimethylsulfoxide (100 ml.) are refluxed together for one week. The unreacted starting materials are removed under vacuum with slight warming up to 50° C. The crude product is recrystallized from a mixture of methanol and ether to yield (2,2 - dichloro-1-methylethyl)dimethylsulfoxonium bromide.

Step B: (2 - chloro - 1 - methylvinyl)dimethylsulfoxonium bromide.—To a suspension of (2,2 - dichloro-1 - methylethyl)dimethylsulfoxonium bromide (27.0 g., 0.1 mole) in dimethylsulfoxide (50 ml.) is added a suspension of potassium tertiary butoxide (10.7 g., 0.095 mole) in dimethylsulfoxide (50 ml.). The reaction mixture is stirred for one hour at room temperature and the solvent then removed under vacuum. The crude product is dissolved in ethanol and the potassium chloride removed by filtration. The ethanol is removed under vacuum to yield the crude product which may be recrystallized from a mixture of ethanol and ether to yield (2-chloro-1-methylvinyl)dimethylsulfoxonium bromide.

Step C: [2 - di-phenylphosphinyl) - 1 - methylvinyl] dimethylsulfoxonium bromide.—(2 - chloro - 1 - methylvinyl)dimethylsulfoxonium bromide (10 g., 0.043 mole) and tri-phenyl phosphite (13.4 g., 0.043 mole) are mixed at −10° C. and slowly heated to 50° C. over a two-hour period. The mixture is cooled and ether (50 ml.) is added to precipitate the product which is washed with ether (50 ml.) and dried to yield [2 - di-phenylphosphinyl)-1-methylvinyl]dimethylsulfoxonium bromide.

Step D: Di-phenyl (cis-1,2 - epoxypropyl)phosphonate.—To a solution of [2 - (di-phenylphosphinyl)-1-methylvinyl]dimethylsulfoxonium bromide (15.27 g., 0.04 mole) in tetrahydrofuran (100 ml.) is added powdered anhydrous potassium hydroxide (2.24 g., 0.04 mole). The reaction mixture is stirred for two hours at room temperature and then filtered to remove potassium chloride and unreacted potassium hydroxide. The solvent is removed from the filtrate, under vacuum, to yield di-phenyl (cis-1,2-epoxypropyl)phosphonate which is converted to sodium salt by basic hydrolysis.

EXAMPLE 5

(Cis-1,2-epoxypropyl)phosphonic acid disodium salt

Step A: (2,2 - dichloro-1-methylethyl)trimethylammonium bromide.—1,1-dichloro-2-bromopropane (10 g., 0.0524 mole) and trimethylamine (25 g., 0.42 mole) are placed in a bomb tube and heated to 100° C. for 8 hours. The tube is cooled and opened and the excess trimethylamine allowed to evaporate. The 1,1-dichloro-2-bromopropane is removed under vacuum to yield (2,2-dichloro-1-methylethyl)trimethylammonium bromide.

Step B: (2-chloro-1-methylvinyl)trimethylammonium bromide.—(2,2 - dichloro - 1-methylethyl)trimethylammonium bromide (9.9 g., 0.0394 mole) in dimethylsulfoxide (25 ml.) is added to a suspension of potassium tertiary butoxide (4.16 g., 0.037 mole) in dimethylsulfoxide (25 ml.). The reaction mixture is stirred for one hour at room temperature. The solvent is removed under vacuum and the (2-chloro-1-methylvinyl)trimethylammonium bromide is extracted with ethanol. The ethanol is removed under vacuum and the product which remains is recrystallized from a mixture of ethanol and ether to yield (2 - chloro - 1-methylvinyl)trimethylammonium bromide.

Step C: [2 - (di-allylphosphinyl)-1-methylvinyl]trimethylammonium bromide.—(2 - chloro - 1 - methylvinyl)trimethylammonium bromide (7.7 g., 0.036 mole) is treated with tri-allyl phosphite (6.1 g., 0.036 mole) at −10° C. The reaction mixture is slowly heated to 50° C. and held there for a two-hour period to afford [2 - (di-allylphosphinyl) - 1 - methylvinyl]trimethylammonium bromide.

Step D: Di-allyl (Cis - 1,2 - epoxypropyl)phosphonate.—To a solution of [2 - (di-allylphosphinyl) - 1-methylvinyl]trimethylammonium bromide (0.0344 mole) in tetrahydrofuran (100 ml.) is added powdered anhydrous potassium hydroxide (1.96 g., 0.035 mole). The reaction mixture is stirred for several hours at ambient temperature. The potassium chloride and unreacted potassium hydroxide is removed by filtration and the filtrate concentrated under vacuum to yield di-allyl (cis-1,2-epoxypropyl)phosphonate.

Step E: (Cis - 1,2 - epoxypropyl)phosphonic acid.— A solution of di-allyl (cis - 1,2 - epoxypropyl)phosphonate (1.91 g., 0.01 mole) in ethanol (20 ml.) is shaken with hydrogen under 40 p.s.i. of pressure at room temperature until the calculated hydrogen uptake for the removal of the two allyl groups is essentially accomplished. The reaction mixture is filtered free of catalyst and the filtrate concentrated under vacuum to yield (cis-1,2-epoxypropyl)phosphonic acid.

EXAMPLE 6

(Cis-1,2-epoxypropyl)phosphonic acid monopotassium salt

To a solution of potassium hydroxide (10.9 g., 0.195 mole) in water (50 ml.) is added [2 - (dichlorophosphinyl) - 1 - methylvinyl]dimethylsulfonium chloride (10.0 g., 0.0394 mole) at 0° C. The reaction mixture is stirred for 30 minutes at 0° C. and the pH is then adjusted to 6. Removal of the solvent yield (cis - 1,2-epoxypropyl)phosphonic acid monopotassium salt.

Thus, by substituting the appropriate derivative of phosphonic acid for the trimethyl phosphite of Example 1, Step C, and by following substantially the procedures described in Example 1, Steps C—D, or by substituting for the dichloromethoxy phosphine of Example 2, Step A, an equimolar quantity of an appropriate dihlaoalkoxy substituted phosphine and by following the procedure described in Example 2, Steps A and B, all of the products of this invention may be prepared. The following equation illustrates the manner in which the ester and amide products of Table I may be prepared:

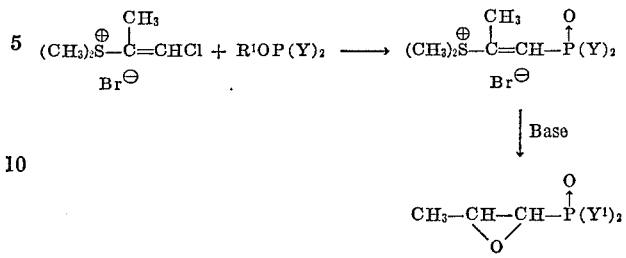

TABLE I

| Example | R¹ | Y | Y¹ | Base |
|---|---|---|---|---|
| 7 | —CH(CH$_3$)$_2$ | —OCH(CH$_3$)$_2$ | —OCH(CH$_3$)$_2$ | Anhydride KOH. |
| 8 | —C(CH$_3$)$_3$ | —OC(CH$_3$)$_3$ | —OC(CH$_3$)$_3$ | Do. |
| 9 | —CH$_2$C≡CH | —OCH$_2$C≡CH | —OCH$_2$C≡CH | Do. |
| 10 | —CH$_2$(CH$_2$)$_3$CH$_3$ | —OCH$_2$(CH$_2$)$_3$CH$_3$ | —OCH$_2$(CH$_2$)$_3$CH$_3$ | Do. |
| 11 | —C$_6$H$_5$ | —OC$_6$H$_5$ | —OC$_6$H$_5$ | Do. |
| 12 | —CH$_2$CH$_3$ | —N(C$_2$H$_5$)$_2$ | —N(C$_2$H$_5$)$_2$ | Do. |
| 13 | —CH$_2$CH$_3$ | —N(CH$_3$)$_2$ | —N(CH$_3$)$_2$ | Do. |

The above examples are illustrative of the novel method disclosed and it is to be understood that the invention is not to be limited by the specific illustrative examples but rather embrace all the variations and modifications thereof which fall within the scope of the foregoing discussion and the appended claims.

I claim:
1. A compound of the formula:

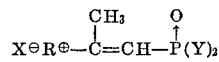

wherein R⊕ is selected from di-lower alkylsulfoxonium, tri-lower alkylammonium, tri-arylphosphonium or di-lower alkylsulfonium; X⊖ is a halo anion; and Y is halo.

2. The compound of claim 1 wherein Y is chloro or bromo.

3. The compound according to claim 1 of the formula:

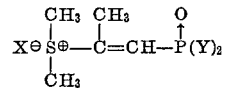

wherein X⊖ is a halo anion and Y is halo.

4. [2 - (dichlorophosphinyl) - 1 - methylvinyl]dimethylsulfonium bromide.

References Cited

UNITED STATES PATENTS 3,579,570    5/1971    Nicholson _____ 260—348 R
3,494,965    2/1970    Jones _____ 260—609

OTHER REFERENCES

Houben–Weyl, Methoden der Organischen Chemie, p. 404.

Arbuzov et al. Bull. Acad. Sci–USSR, Chem. Div. (1954) pp. 361–367.

LORRAINE A. WEINBERGER, Primary Examiner
R. GERSTL, Assistant Examiner

U.S. Cl. X.R.

260—348 R, 502.4 P, 502.4 R, 502.5 R, 551 P, 567.6 M, 606.5 F, 607 R, 607 B, 926, 945, 947; 424—203